United States Patent
Liu et al.

(10) Patent No.: US 10,998,935 B2
(45) Date of Patent: May 4, 2021

(54) SECONDARY ELECTRIC POWER DISTRIBUTION SYSTEM (SEPDS) TO FACILITATE AIRCRAFT CONNECTIVITY

(71) Applicant: Honeywell Limited, Mississauga (CA)

(72) Inventors: Zhenning Liu, Mississauga (CA); Randy Fuller, Hillsburgh (CA); Karthik V J, Bangalore (IN); Rohit Parashar, Bangalore (IN); Prashant Purushotham Prabhu K, Bangalore (IN); Muthukumar Murthy, Vellore (IN)

(73) Assignee: Honeywell Limited, Charlotte, NC (US)

( * ) Notice: Subject to any disclaimer, the term of this patent is extended or adjusted under 35 U.S.C. 154(b) by 0 days.

(21) Appl. No.: 16/280,801

(22) Filed: Feb. 20, 2019

(65) Prior Publication Data

US 2020/0266855 A1     Aug. 20, 2020

(51) Int. Cl.
*H04B 3/54* (2006.01)
*B64D 45/00* (2006.01)
*H04L 12/40* (2006.01)

(52) U.S. Cl.
CPC ............ *H04B 3/546* (2013.01); *B64D 45/00* (2013.01); *H04L 12/40* (2013.01); *B64D 2045/0085* (2013.01); *B64D 2221/00* (2013.01); *H04B 2203/5441* (2013.01);
(Continued)

(58) Field of Classification Search
CPC ............ H04B 3/546; H04B 2203/5441; H04B 2203/5458; H04B 2203/5495; B64D 45/00; B64D 2045/0085; B64D 2221/00; H04L 12/40; H04L 2012/4028
See application file for complete search history.

(56) References Cited

U.S. PATENT DOCUMENTS

| 7,038,897 B2 | 5/2006 | Csanky et al. |
| 7,177,125 B2 | 2/2007 | Lazarovich et al. |
| 7,282,922 B2 | 10/2007 | Lo et al. |

(Continued)

FOREIGN PATENT DOCUMENTS

| CN | 107211588 B | 1/2014 |
| CN | 104316834 A | 1/2015 |
| WO | 2011043514 A1 | 4/2011 |

OTHER PUBLICATIONS

Anonymous; "Implementing Interconnected Generation in Future Civil Aircraft"; Abstract of NASA Tech Briefs, suppl. Aerospace & Space Defense Technology: 39-40. New York: Associated Business Publications; Feb. 2014.

(Continued)

*Primary Examiner* — Nay Tun
(74) *Attorney, Agent, or Firm* — Fogg & Powers LLC

(57) ABSTRACT

A secondary power distribution box (SPDB), solid state power controller (SSPC) line replacement module or printed board assembly (LRM/PBA), integrated power distribution and avionics system, and method of power distribution are disclosed. For example, the method includes receiving electrical power from a power source at a power feeder network, communicating with at least one load of a plurality of loads at least in part over the power feeder network, and coupling the electrical power to the at least one load of the plurality of loads in response to the communicating.

20 Claims, 5 Drawing Sheets

(52) U.S. Cl.
CPC ............... *H04B 2203/5458* (2013.01); *H04B 2203/5495* (2013.01); *H04L 2012/4028* (2013.01)

(56) References Cited

U.S. PATENT DOCUMENTS

| | | | |
|---|---|---|---|
| 7,505,820 B2 | 3/2009 | Plivcic et al. | |
| 7,598,625 B2* | 10/2009 | Yu | H02J 13/0003 307/131 |
| 7,634,329 B2 | 12/2009 | Liu et al. | |
| 7,732,939 B2 | 6/2010 | Fuller et al. | |
| 7,796,366 B2 | 9/2010 | Kilroy et al. | |
| 7,800,245 B2* | 9/2010 | Michalko | H02J 5/00 307/19 |
| 7,868,621 B2* | 1/2011 | Liu | G01R 31/008 324/512 |
| 8,022,711 B2 | 9/2011 | Oldenburg et al. | |
| 8,023,236 B2 | 9/2011 | Greither et al. | |
| 8,276,996 B2 | 10/2012 | Lesesky et al. | |
| 8,320,090 B2 | 11/2012 | Rozman et al. | |
| 8,788,138 B1 | 7/2014 | Yogesha et al. | |
| 8,861,162 B2 | 10/2014 | Fuller et al. | |
| 9,489,340 B2 | 11/2016 | Safa-Bakhsh et al. | |
| 10,391,957 B2* | 8/2019 | Emrani | H02H 3/38 |
| 2005/0116814 A1* | 6/2005 | Rodgers | H02J 3/14 340/538 |
| 2008/0217471 A1* | 9/2008 | Liu | G05B 23/0213 244/1 R |
| 2008/0303353 A1* | 12/2008 | Yu | H02J 13/0003 307/131 |
| 2009/0015063 A1* | 1/2009 | Michalko | H02J 5/00 307/19 |
| 2009/0228223 A1* | 9/2009 | Liu | G01R 31/008 702/59 |
| 2012/0275084 A1 | 11/2012 | Familiant et al. | |
| 2016/0111880 A1* | 4/2016 | Terai | H02J 7/35 700/287 |
| 2017/0018962 A1* | 1/2017 | Shimizu | G01R 21/133 |
| 2017/0203705 A1 | 7/2017 | Fritz et al. | |
| 2017/0222436 A1* | 8/2017 | Wendt | H02J 1/08 |
| 2017/0282819 A1* | 10/2017 | Emrani | H02H 3/202 |
| 2018/0152015 A1* | 5/2018 | Cheng | H02H 5/12 |
| 2018/0197254 A1* | 7/2018 | Yoscovich | G05F 1/67 |
| 2019/0366955 A1* | 12/2019 | Heinisch | B60R 16/03 |

OTHER PUBLICATIONS

Kim, Charles, et al.; "Detection of Intermittent Faults in Aircraft Electrical Wire by Utilizing Dower Line Communication"; 9th Joint FAA/DoD/NASA Conference on Aging Aircraft; Mar. 7, 2006; Atlanta, GA; pp. 1-9; www.mwftr.com/charlesk.html.

Liu, Zhenning, et al.; "Power Line Commmunication and Real-Time Wiring Fault Location"; U.S. Appl. No. 15/821,156, filed Nov. 22, 2017; pp. 1-30; Published: US.

O'Brien, John, et al.; "Distributed and remote control of flight control actuation using power line communications"; Published in Digital Avionics Systems Conference, 2008. DASC. IEEE/AIAA 27th. Abstract from IEEE Xplore, retrieved rom the Internet at: http://ieeexplore.ieee.org/abstract/document/4702764/.

* cited by examiner

SECONDARY ELECTRIC POWER DISTRIBUTION SYSTEM (SEPDS) TO FACILITATE AIRCRAFT CONNECTIVITY

BACKGROUND

It is widely recognized that the benefits of the evolving "connected aircraft" concept are considerably greater than merely enabling airline passengers to access and surf the Internet while aircraft are in-flight. For example, aircraft program developers envision that future "connected aircraft" will be capable of capturing data indicating the "health" of every aircraft system and equipment, including the avionics system, while in-flight. This in-flight data is expected to be utilized, for example, to enhance the scheduling of aircraft maintenance and monitoring of the overall health trend of the aircraft in fleets. However, the ability to capture such data while in-flight requires the aircraft involved to have system-wide data access and substantial data processing and communication capabilities, which come at a very high cost. Consequently, it is critical that aircraft designers will be capable of achieving these capabilities cost-effectively and ideally with the minimal introduction of new, dedicated equipment.

In the existing aircraft, electrical power is generated by numerous power sources and distributed to power buses in a primary distribution panel (PDP). The electrical power is then delivered from the PDP to various electrical loads (e.g., avionics, utilities, actuators, controllers, sensors) by a secondary electric power distribution system (SEPDS). The SEPDS includes a plurality of secondary power distribution boxes (SPDBs) located throughout the aircraft. Each SPDB contains numerous solid state power control (SSPC) line replacement modules (LRMs) or printed board assemblies (PBAs), and each SSPC LRM/PBA comprises multiple SSPC channels that control the electric power delivery to their corresponding electrical loads via bundles of electrical wires or feeders. These loads can include, for example, sensors, remote data concentrators (RDCs), and avionics controllers and the like.

Notably, a substantial number of the sensors in the aircraft are hard-wired to corresponding RDCs. In turn, each RDC is linked to one or more of the aircraft's controllers by dedicated serial data buses, and the data signals from each one of the sensors are coupled to the controllers via the serial data buses. These signal wires and the feeder wires connecting to the SPDBs form a very complex wire harness, which not only requires the use of special integration panels to facilitate the construction and installation of the wire bundles, but can also create large electromagnetic interference (EMI) loops and increase the likelihood of fault current hazards. Since the SEPDS and the avionics system are traditionally designed as separate aircraft systems, it is difficult (if not impossible) to produce an optimal wiring harness that can take advantage of the colocation of the SEPDS and the avionics system and the computation resources built-in with the SSPC-based SEPDS.

For the reasons stated above and for other reasons stated below which will become apparent to those skilled in the art upon reading and understanding the specification, there is a need in the art for a technique that can be utilized to take advantage of the data processing capabilities of the SSPC LRM/PBAs, and the distributed natures of the new generation avionics' systems to gather data from the many sensors and systems of the aircraft to truly implement the connected aircraft.

SUMMARY

Embodiments disclosed herein present techniques for enhancing aircraft connectivity by incorporating PLC and wireless technologies in an SPDB and taking advantage of the enhanced data processing capabilities of the SSPC LRM/PBAs.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout the figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

With the current trend of the new generation of distributed avionics systems, the avionics/utility controllers and RDCs (linked together by the aircrafts' backbone data buses) will be both physically and functionally allocated throughout the aircraft close to the components they control, and potentially located "side-by-side" with the distributed SPDBs. Consequently, opportunities will exist to treat both systems as an integrated one, both physically and functionally, to achieve the ultimate cost and weight reductions in wiring harness and aircraft equipment count, as well as enhanced system functions.

Moreover, the existing SEPDSs are not designed to take advantage of the new power line communication (PLC) and wireless technologies available that could enhance aircraft connectivity utilizing the aircrafts' existing power feeder networks and the built-in intelligence of the LRM/PBAs of the SSPCs.

Figure 1:
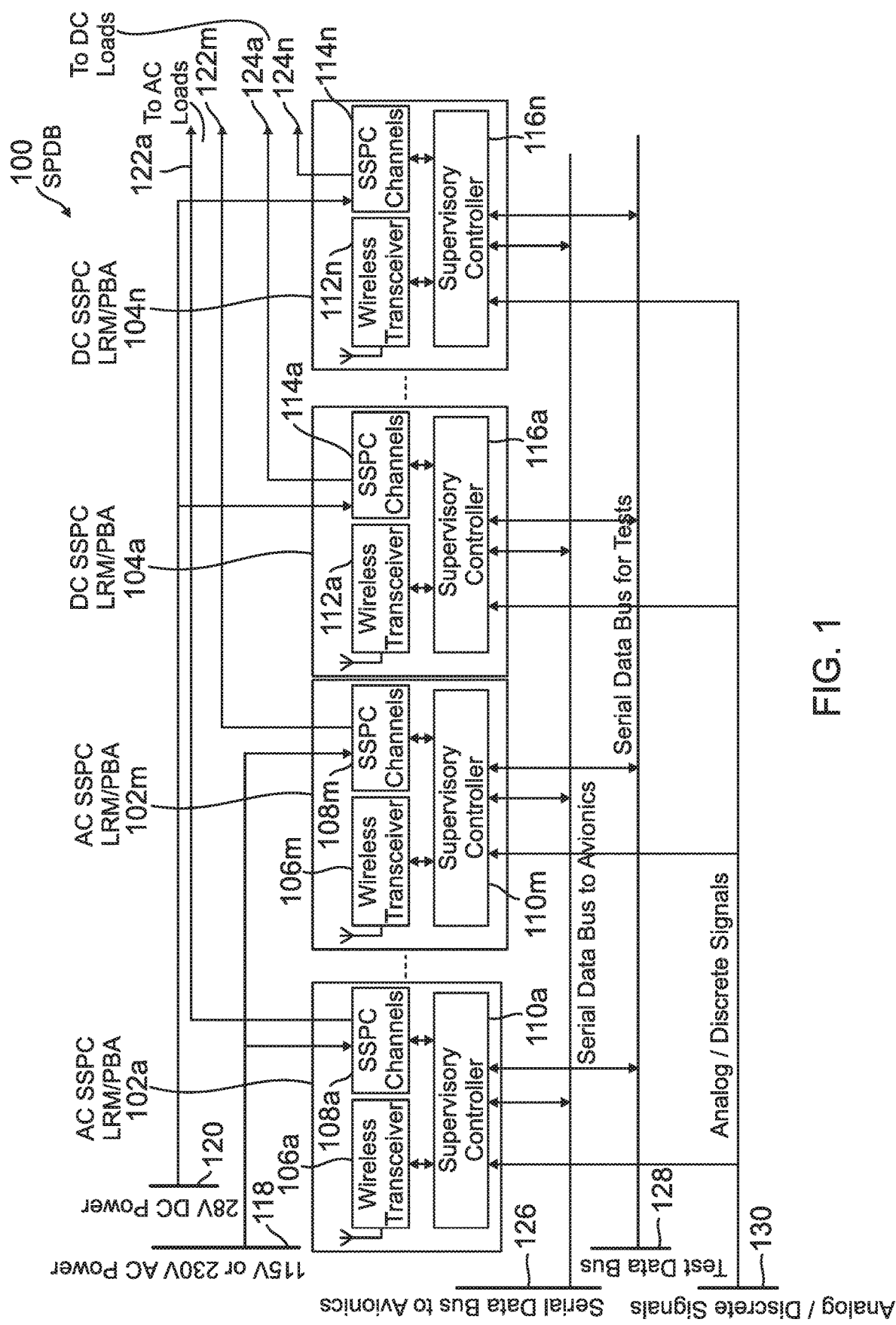
FIG. 1 is a schematic block diagram depicting a secondary power distribution box (SPDB) that can be utilized to implement one example embodiment of the present invention.

FIG. 1 is a schematic block diagram depicting a secondary power distribution box (SPDB) 100, which can be utilized to implement one example embodiment of the present invention. Referring to FIG. 1, the exemplary SPDB 100 includes a plurality of alternating current (AC) SSPC LRM/PBAs 102a to 102m (e.g., with "m" representing the final or AC SSPC LRM/PBA of a series of AC SSPC LRM/PBAs), and a plurality of direct current (DC) SSPC LRM/PBAs 104a to 104n (e.g., with "n" representing the final DC SSPC LRM/PBA of a series of DC SSPC LRM/PBAs). Each one of the AC SSPC LRM/PBAs 102a to 102m includes a wireless transceiver 106a to 106m, one or more SSPC channels 108a to 108m, and a supervisory controller 110a to 110m. Also, each one of the DC SSPC LRM/PBAs 104a to 104n includes a wireless transceiver 112a to 112n, one or more SSPC channels 114a to 114n, and a supervisory controller 116a to 116n.

For this example embodiment, a first (e.g., 115V AC or 230V AC) power source 118 is electrically connected to a respective input of the one or more (AC) SSPC channels 108a to 108m, and a second (e.g., 28V DC) power source 120 is electrically connected to a respective input of the one or more (DC) SSPC channels 114a to 114n. Also, a plurality of AC loads 122a to 122m are electrically connected to respective outputs of the (AC) SSPC channels 108a to 108m, and a plurality of DC loads 124a to 124n are electrically connected to respective outputs of the (DC) SSPC channels 114a to 114n.

Furthermore, a first serial data bus 126 communicatively couples, for two-way communications, the aircraft's avionics system to/from the respective first input/output (I/O) terminals of the supervisory controllers 110a to 110m and 116a to 116n. Also, a second serial data bus 128 communicatively couples, for two-way communications, a test system of the aircraft to/from the respective second I/O terminals of the supervisory controllers 110a to 110m and 116a to 116n. Moreover, a third bus 130 communicatively couples analog and/or discrete signals from, for example, aircraft systems other than the avionics and test systems, to a set of respective inputs of the supervisory controllers 110a to 110m and 116a to 116n.

Notably, referring to FIG. 1 for this example embodiment, the functional components of the exemplary SPDB 100 include a plurality of upstream power feeders (e.g., 118, 120), a plurality of load feeders (e.g., 122a to 122m, 124a to 124n), a plurality of wireless communication interfaces (e.g., 106a to 106m and 112a to 112n), a plurality of external analog/discrete signal interfaces (e.g., 130), and a plurality of AC/DC SSPC PBA/LRMs (102a to 102m and 104a to 104n).

For example, the upstream power feeders are utilized to receive electrical power from the upstream PDPs. The load feeders are utilized to deliver the electrical power they receive from the PDPs to various electrical loads. As such, the combination of the upstream power feeders and the load feeders form a feeder network that physically (and electrically) links together the aircraft's onboard electronic and electrical components or equipment. Also, this feeder network can be utilized as a communication medium to facilitate the exchange of information between the aircraft's equipment and the loads, without having to rely on dedicated communication networks and/or buses with their concomitant increased weight and cost.

For this embodiment, the SPDB 100 can include, for example, one or more of two types of standard serial data buses (e.g., ARINC 429 or Can Bus) for data communications between the distributed avionics system and the SPDB 100, and a second type of data bus (e.g., RS-485 or Ethernet and the like) for operating software, loading configuration data, software testing and debugging, and providing interfaces to other (e.g., external) maintenance equipment (e.g., power distribution management computer or PDMC, and the like).

The SPDB 100 includes a wireless communication capability. For example, the wireless transceivers (e.g., 106a to 106m and 112a to 112n) are located at the AC and DC SSPC LRM/PBAs (e.g., 102a to 102m and 104a to 104n). However, for example, the antennas for the wireless transceivers can be mounted externally to the transceivers, or embedded inside the chassis of the SPDB 100 to ensure the integrity of the transmitted/received wireless signals. Notably, in order to facilitate the connectivity of the aircraft involved, if the wireless communication capability embedded in the SPDB 100 is intended primarily to just receive data from wireless sensors or "back-up" commands from the avionics system (e.g., if the normal communications between the SPDB and the avionics system via a dedicated serial data bus is lost), only one (or fewer than the number of wireless receivers in the SPDB) antenna can be utilized by all of the wireless transceivers (e.g., in a sharing mode of operation).

The SPDB 100 also includes external analog/discrete signal interfaces. For example, the SPDB 100 provides the interfaces and signal conditioning for the various analog and discrete signals received on the bus 130. These signals can be coupled from nearby sensors or other aircraft equipment in a manner similar to that of a sensor's coupling to an RDC. For example, these signals can be non-critical, slow time-varying constant signals that can be collected and passed on to their intended destinations (e.g., avionics system/network), by utilizing the intelligence capabilities (e.g., avionics system's data processing capabilities and communication channels) built into the SSPCs of the SPDB 100. Consequently, some of the RDCs and/or their resources can be saved and utilized for other operations.

Figure 2:
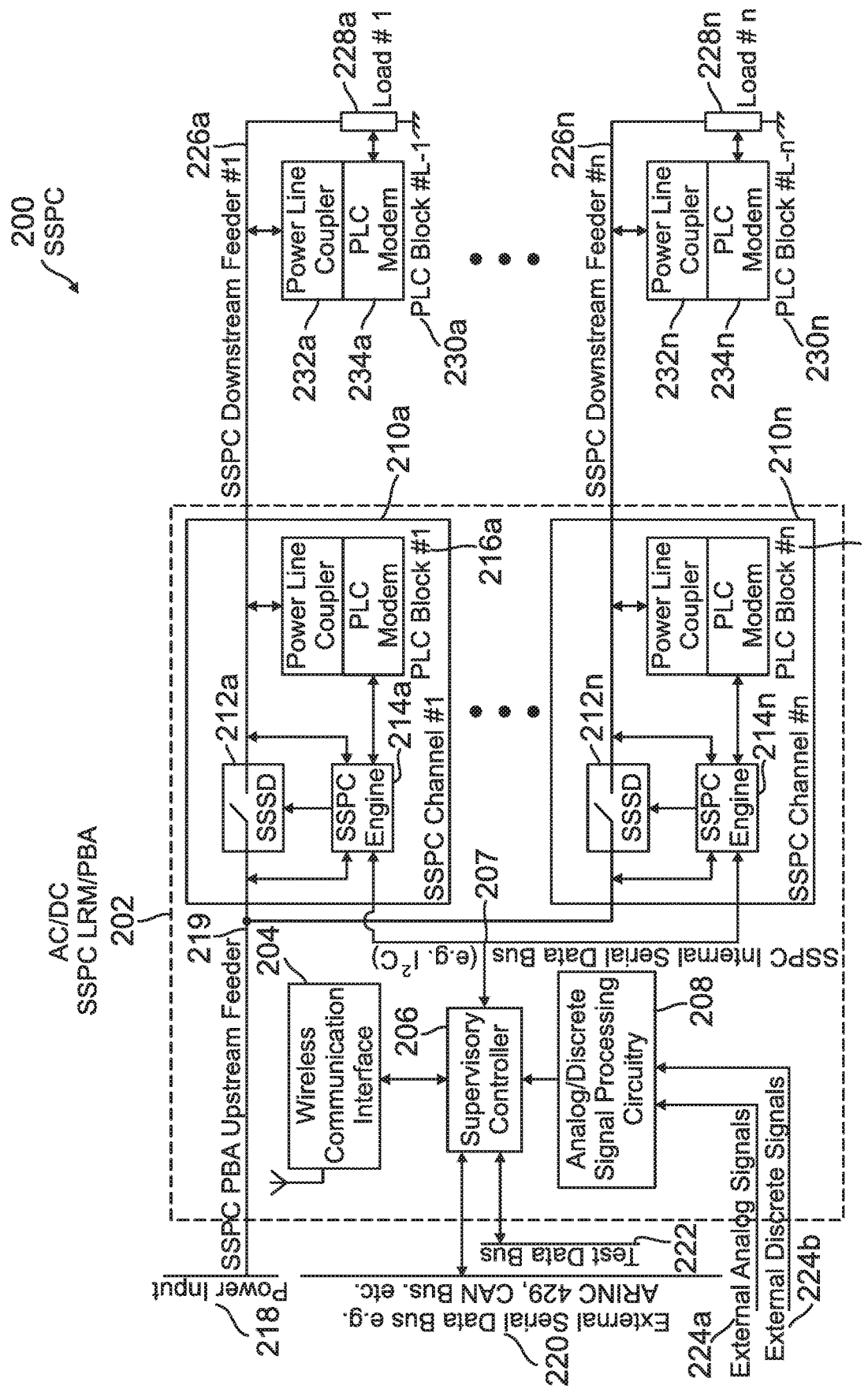
FIG. 2 is a schematic block diagram of a solid state power controller (SSPC) line replacement module/printed board assembly (LRM/PBA) that can be utilized to implement one example embodiment of the present invention.

FIG. 2 is a schematic block diagram depicting an SSPC 200, which can be utilized to implement one example embodiment of the present invention. Referring to FIG. 2, the exemplary SSPC 200 includes an (AC or DC) SSPC LRM/PBA 202. For example, the SSPC LRM/PBA 202 can be utilized to implement one of more of the plurality of AC SSPC LRM/PBAs 102a to 102m or DC SSPC LRM/PBAs 104a to 104n depicted and described above with respect to the example embodiment in FIG. 2. The SSPC 200 also includes a wireless communication transceiver 204, a supervisory controller 206 communicatively coupled for two-way communications to/from the wireless communication transceiver 204, and analog/discrete processing circuitry 208 communicatively coupled to an input of the supervisory controller 206. The supervisory controller 206 is also communicatively coupled for two-way communications via the serial data bus 207 (e.g., $I^2C$, etc.) to/from a respective I/O of each one of a plurality of SSPC channels 210a to 210n. For this example embodiment, each SSPC channel 210a to 210n includes a respective solid state switching device (SSSD) 212a to 212n, SSPC engine 214a to 214n, and power line coupler (PLC) 216a to 216n. Each SSPC engine 214a to 214n is communicatively coupled for communications to/from a respective SSSD 212a to 212n and PLC 216a to 216n.

A power input terminal 218 is electrically connected to an SSPC LRM/PBA upstream feeder 219, which in turn is electrically connected to a respective input of each SSSD 212a to 212n. For example, the power input terminal 218 can be implemented utilizing one of the upstream power feeders 118 or 120 depicted in FIG. 1. Similarly, an external serial data bus 220 (e.g., 126 in FIG. 1) is communicatively coupled for two-way communications to/from the supervisory controller 206, a test data bus 222 (e.g., 128 in FIG. 1) is also communicatively coupled for two-way communications to/from the supervisory controller 206, and a plurality of external analog/discrete signals 224a, 224b (e.g., 130 in FIG. 1) are communicatively coupled to respective inputs of the analog/discrete signal processing circuitry 208. The output of each SSSD 212a to 212n is electrically connected to a respective SSPC downstream (e.g., load) feeder 226a to 226n, which in turn is electrically connected to a respective load 228 to 228n. A plurality of PLCs 230a to 230n are communicatively coupled for two-way communications to/from each one of the respective SSPC downstream (e.g., load) feeders 226a to 226n, and also to/from each load 228a to 228n.

The primary responsibility of the supervisory controller 206 is to control (e.g., via the I²C serial data bus) the power switching/distribution functions of the SSPC channels 210a to 210n, and the communications between the SSPC LRM/PBA 202 and the external interface terminal 220. For example, the external interface terminal 220 can be the terminal of an existing avionics controller, and the communications between the SSPC LRM/PBA 202 and the external interface terminal 220 can be implemented utilizing, for example, the ARINC 429 or CAN data bus and the like. Additionally, the supervisory controller 206 can perform general "housekeeping" tasks, control the configurations of the SSPC loads 228a to 228n, periodic built-in-tests (BITs) for the SSPC LRM/PBA 202, and as the interface to the test data bus (e.g., RS-485 data bus) 222. As such, the supervisory controller 206 is configured to facilitate the loading of the operating software and configuration data to the SSPC LRM/PBA 202 and the software testing and debugging tasks.

Furthermore, the supervisory controller 206 performs the data acquisitions of the analog signals 224a and reads the discrete signals 224b from the analog/discrete signal processing circuitry 208. The supervisory controller 206 forwards those signals (via the external serial data bus 220) to their intended destinations in the avionics system involved. Moreover, the supervisory controller 206 is also capable of interfacing with an external wireless network via the wireless communication transceiver 204. This capability thus enables the SSPC LRM/PBA 202 to receive signals including information from the vehicle's wireless sensors (e.g., information other than load current and voltage), which information can be utilized to determine the overall health condition of the SSPC loads 228a to 228n associated with (or controlled by) the SSPC LRM/PBA 202. The supervisory controller 206 then forwards that information (e.g., for additional processing) to the relevant channel(s) of the SSPC channels 210a to 210n utilizing the SSPC internal serial data bus 207 (e.g., I²C). Notably, this wireless capability can also function as a backup mechanism for controlling the SSPC channels 210a to 210n if, for example, the communications connection is lost between the SSPC LRM/PBA 202 and the external interface terminal 220. For example, the communications path could be lost between the external serial data bus 207 and the upstream communication chains (e.g., failure of one or more of the data bus transceivers, backplane, communications from/to the avionics system, and the like). Consequently, with this backup capability, the criticality of the existing communications chains might be relaxed.

Each one of the SSPC channels 210a to 210n includes an SSSD 212a to 212n that can be utilized to connect and disconnect the power input 218 to/from a load 228a to 228n, an SSPC engine 214a to 214n (e.g., a digital signal processor or DSP, microprocessor, or microcontroller and the like) utilized to control the (e.g., switching) functions of the respective SSPC channel 210a to 210n, and a power line coupler 230a to 230n. The primary responsibility of each one of the SSPC engines 214a to 214n is to receive command signals from the supervisory controller 206 to control the on/off states of the respective SSSDs 212a to 212n, provide feedback signals (e.g., via the SSPC internal serial data bus 207) to the supervisory controller 206 regarding the load and trip status of the respective SSPC channel 210a to 210n, and provide protection for each respective downstream/load feeder 226a to 226n. Each SSPC engine 214a to 214n is also configured to turn off the respective SSSD 212a to 212n if either an electrical arc or short circuit fault occurs. For example, each SSPC engine 214a to 214n could estimate (e.g., calculate) the thermal energy level inside the respective feeder 226a to 226n utilizing, for example, the load current signal sensed by an associated current sensor, or by determining that either an electrical arc fault or short circuit fault has occurred.

Each SSPC engine 214a to 214n is also configured to collect and pre-process information that characterizes the "health" condition of its associated upstream feeder 219 and load feeder 226a to 226n. For example, this information can be based on a combination of directly sampled load currents and voltages along with other functional information collected either directly through the interface with the designated PLC 216a to 216n, or received from the supervisory controller 206 via the SSPC internal serial data bus 207. Additionally, each SSPC engine 214a to 214n is responsible for initiating power line communications with the respective load-end PLC terminal (e.g., node) 228a to 228n via the respective SSPC downstream feeder 226a to 226n and PLC 230a to 230n, and executing closed-loop control of the corresponding load 228a to 228n as enabled by the respective PLC 230a to 230n. Each PLC 230a to 230n associated with each SSPC channel 210 to 210n is configured to be utilized to facilitate the data communications carried over the power feeder network (e.g., 226a to 226n). As such, each PLC 230a to 230n includes a respective power line coupler 232a to 232n and PLC modem 234a to 234n. Each PLC modem 234a to 234n is responsible for processing its data signals, and each power line coupler 232a to 232n is responsible for coupling the data signals generated by the associated PLC modem 234a to 234n to/from the power feeder network. Each PLC 216a to 216n associated with a respective SSPC engine 214a to 214n is configured to communicate (e.g., via an associated SSPC downstream feeder 226a to 226n) with a respective (PLC) node located, for example, in close proximity to a respective load 228a to 228n.

For this example embodiment, the wireless communication interface 204 includes a wireless network transceiver and antenna (e.g., 106a or 112a in FIG. 1). The wireless communication interface 204 is configured to facilitate the interface/data communications between the supervisory controller 206 in the relevant AC/DC SSPC LRM/PBA 202 and a wireless communication network that can be accessed, for example, by associated wireless sensors and controllers of the avionics system involved.

Figure 3:
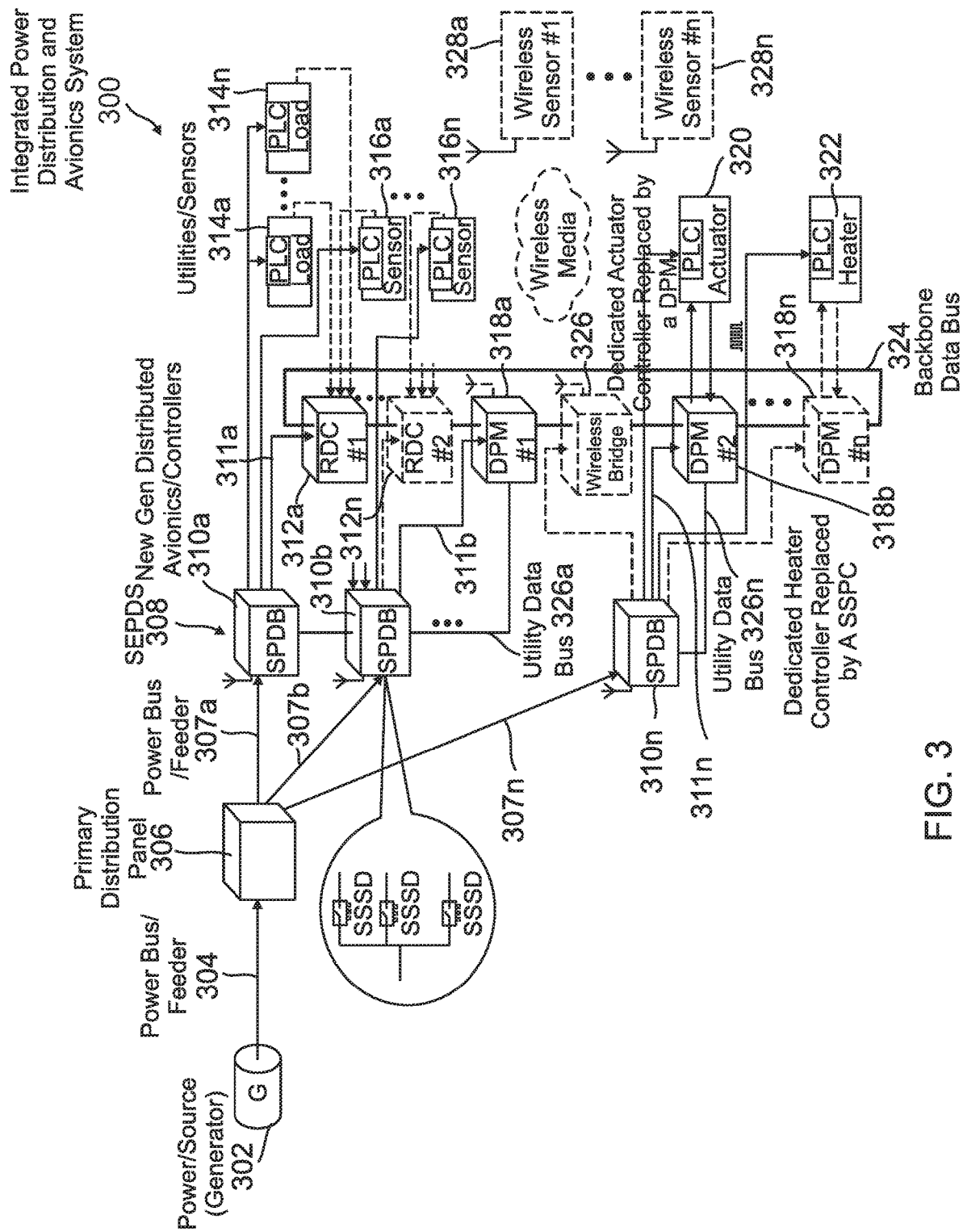
FIG. 3 is a schematic block diagram of an integrated power distribution and avionics system that can be utilized to implement one example embodiment of the present invention.

FIG. 3 is a schematic block diagram depicting an integrated power distribution and avionics system 300, which can be utilized to implement one example embodiment of the present invention. For example, the integrated power distribution and avionics system 300 can be a power distribution system located onboard or externally to, a vehicle. As used herein, the term vehicle refers to any device on which the integrated power distribution and avionics system 300 can be implemented. For example, a vehicle can include an aircraft, motor vehicle, missile, handheld device, and the like. Referring to FIG. 3, the exemplary integrated power distribution and avionics system 300 includes a power source (e.g., generator) 302 configured to generate electrical power and convey that electrical power via a power bus or power feeder 304 to a Primary Distribution Panel (PDP) 306. A plurality of power buses/feeders 307a to 307n convey the electrical power from the PDP 306 to a Secondary Electrical Power Distribution System (SEPDS) 308 via a plurality of power buses/feeders 307a to 307n, which are electrically connected to a plurality of Secondary Power Distribution Boxes (SPDBs) 310a to 310n associated with the SEPDS 308. For this example embodiment, the first SPDB 310a is electrically connected to a plurality of RDCs 312a to 312n by a respective power line 311a to 311n, and configured to distribute electrical power to the RDCs 312a to 312n. The first SPDB 310a is also electrically connected to a plurality of PLC nodes/loads 314a to 314n and a PLC node/sensor 316a, and configured to distribute electrical power to the PLC nodes/loads 314a to 314n and the PLC node/sensor 316a. Similarly, the nth SPDB 310n in the series 310a to 310n is electrically connected to a PLC node/sensor 316n and an RDC 312n-1, and configured to distribute electrical power to the PLC node/sensor 316n and the RDC 312n-1. Notably, as indicated by the dashed block 312n, the SSPC-based SEPDS 308 eliminates the need for one or more of the RDCs (e.g., 312n), in contrast to the configurations of the existing SEPDSs.

Additionally, the second SPDB 310b is electrically connected to a distributed processing module (DPM) 318a by a power bus/feeder line 311a, and the SPDB 310n is electrically connected to the DPM 318n by a power bus-feeder line 311n. Notably, as indicated by the dashed block 318n, the SSPC-based SEPDS 308 eliminates the need for one or more of the DPMs (e.g., 318n). As such, in accordance with the above-described teachings of the specification, the SSPC channels in the SPDBs 310a to 310n can be utilized to provide power to one or more PLC nodes/actuators (e.g., 320) and/or PLC nodes/heaters 322. Consequently, the SSPC-based SEPDS 308 eliminates the need for one or more of the dedicated actuator and/or heater controllers utilized in existing systems. Notably, a backbone data bus 324 provides backbone data communications between the RDCs 312a to 312n and DPMs 318a to 318n, and a plurality of utility data buses 326a to 326n (e.g., ARINC 429 or CAN bus) provide data communications between the SPDBs 310b to 310n and the respective DPMs 318 to 318n. Also, note that one or more wireless communication bridges (e.g., 326) can be eliminated by the wireless communication interfaces of each of the SPDBs 310a to 310n (as indicated by the respective antennas shown). As such, one or more of a plurality of wireless sensors 328a to 328n can communicate with and provide sensor information directly to one or more of the wireless communication interfaces of the SPDBs 310a to 310n.

Figure 4:
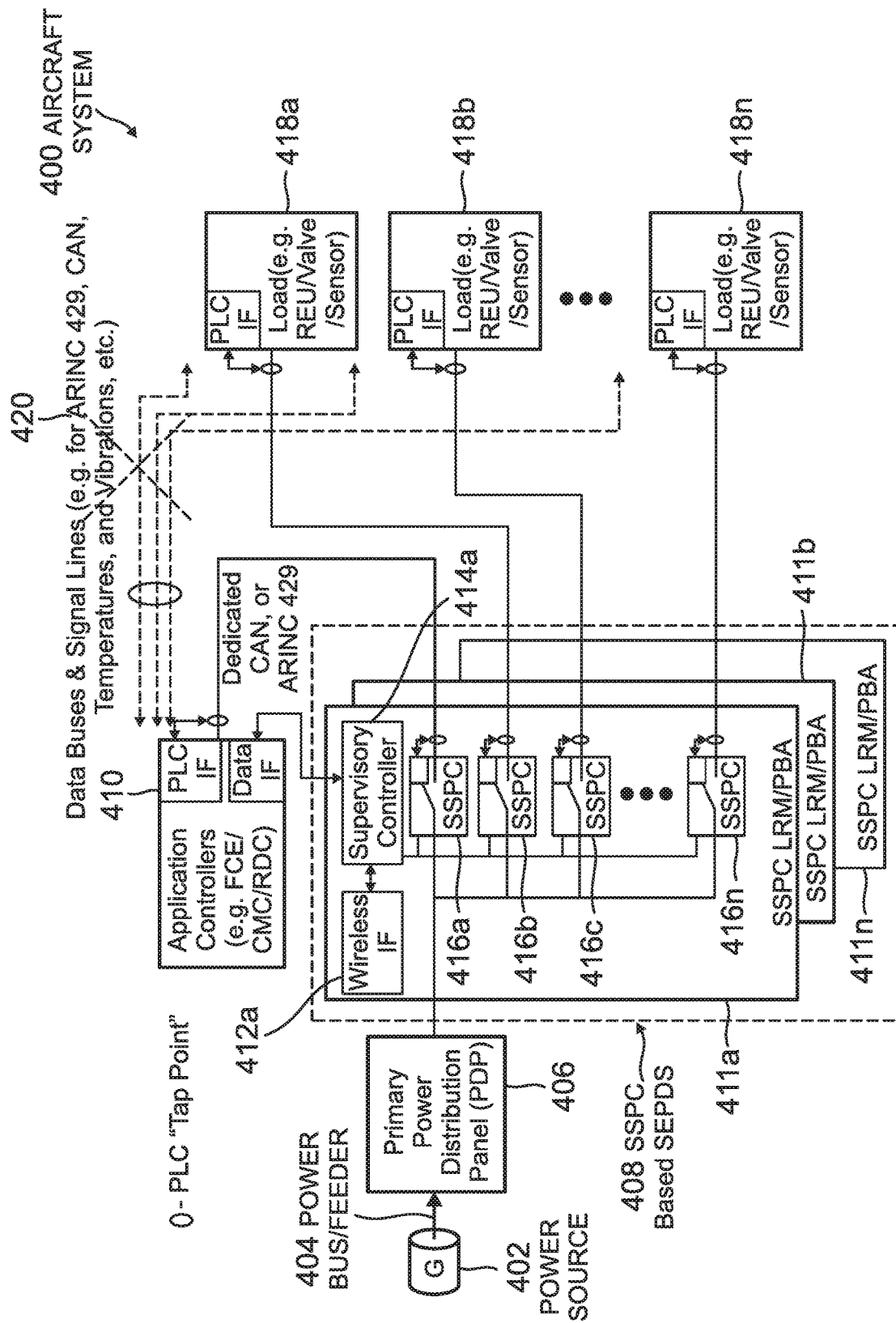
FIG. 4 is a schematic block diagram of an aircraft system that can be utilized to implement one example embodiment of the present invention.

FIG. 4 is a schematic block diagram depicting an aircraft system 400, which can be utilized to implement one example embodiment of the present invention. For example, the aircraft system 400 can be a distributed avionics system onboard a vehicle, such as an aircraft, guided munition, missile and the like. As another example, the aircraft system 400 can be located internally to a vehicle (e.g., aircraft) and utilized to test components and/or operational or control functions of the vehicle involved. In any event, referring to the exemplary embodiment depicted in FIG. 4, the aircraft system 400 includes a power source (e.g., generator) 402 coupled to a PDP 406 by a power bus/feeder 404. For example, the power source 402, power bus/feeder 404 and PDP 406 can be implemented utilizing the power source 302, power bus/feeder 304 and PDP 306 depicted in and described above with respect to FIG. 3.

The aircraft system 400 also includes an SEPDS 408, which receives electrical power from the PDP 406. For example, the SEPDS 408 can be implemented utilizing the SEPDS 308 depicted in and described above with respect to FIG. 3. The SEPDS 408 includes a plurality of (e.g., AC and/or DC) SSPC LRM/PBAs 411a to 411n. For example, in one embodiment, each one of the plurality of SSPC LRM/PBAs 411a to 411n includes a wireless communication interface (e.g., 412a), a supervisory controller (e.g., 414a), and a plurality of SSPC channels/switches (e.g., 416a to 416n). The SSPC LRM/PBAs 411a to 411n can be implemented utilizing, for example, the AC/DC SSPC LRM/PBA 202 depicted in and described above with respect to FIG. 2. One or more application controllers 410 such as, for example, a Flight Control Electronics (FCE) controller, CMC Electronics' controller, or RDC is electrically connected and also communicatively coupled to an output terminal of the SSPC channel/switch 416a for power distribution and data communications. Also, the output terminal of each one of the SSPC channel/switches 416b to 416n is electrically connected and also communicatively coupled to a corresponding PLC node/load 418a to 418n for power distribution and data communications. Notably, as indicated by the dashed "X" 420, the SSPC-based SEPDS 408 eliminates the need for a plurality of data buses and signal lines that are required in the existing aircraft systems.

Figure 5:
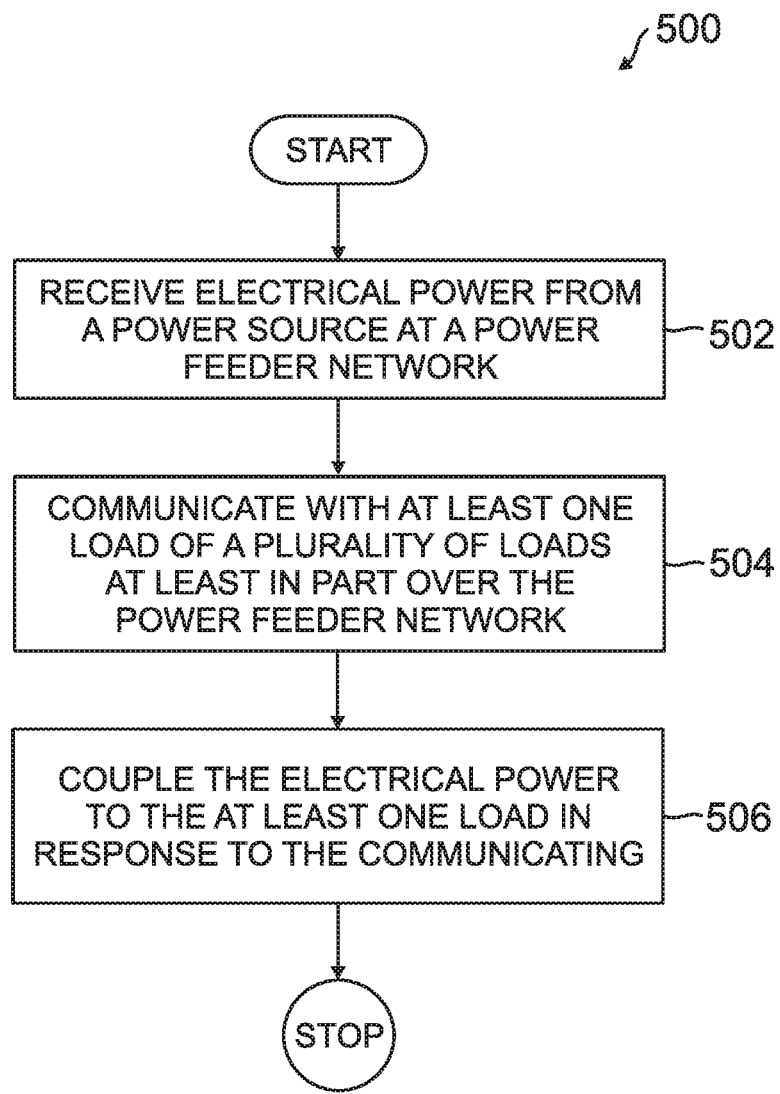
FIG. 5 is a flow diagram illustrating a method that can be utilized to implement one example embodiment of the present invention.

FIG. 5 is a flow diagram illustrating a method 500, which can be utilized to implement one example embodiment of the present invention. Referring to FIG. 5 and the example embodiment illustrated in FIGS. 1 and 2, the exemplary method 500 begins with receiving electrical power from a power source at a power feeder network (502). For example, AC power is received by the SSPC channels 108a to 108n from the input terminal 118 depicted in FIG. 1, and DC power is received by the SSPC channels 114a to 114n from the input terminal 120. Referring to the exemplary AC/DC SSPC LRM/PBA 202 depicted in FIG. 2, the electrical (AC or DC) power is received from the power input 218 via the SSPC PBA upstream feeder 219. In this example embodiment, the SSPC PBA upstream feeder 219 and the SSPC downstream feeder 226a form the power feeder network. The method 500 continues with communicating with at least one load of a plurality of loads at least in part over the power feeder network (504). For example, the supervisory controller 206 depicted in FIG. 2 communicates with the PLC modem 216a via the internal serial data bus 207 and the SSPC engine 214a, and the PLC modem 216a further communicates with the load 228a via the SSPC downstream feeder 226a, the power line coupler 232a, and the PLC modem 234a. Next, the method continues with coupling the received electrical power to the at least one load of the plurality of loads in response to the communicating (506). For example, in response to a communication (e.g., control signal) received from the supervisory controller 206, the SSPC engine 214a causes the SSDC 212a to change state and thereby connect the received power from the SSPC PBA upstream feeder 219 to the SSPC downstream feeder 226a, the power line coupler 232a, and the PLC modem 234a. In turn, the PLC modem 234a communicates with the load 228a and thereby causes the load 228a to configure and receive the electrical power from the SSPC downstream feeder 226a. The method is then terminated.

It should be understood that elements of the above described embodiments and illustrative figures may be used in various combinations with each other to produce still further embodiments which are explicitly intended as within the scope of the present disclosure.

EXAMPLE EMBODIMENTS

Example 1 includes a secondary power distribution box, comprising: an upstream power feeder configured to receive AC power or DC power from a primary power source; a load feeder configured to provide the AC power or DC power from the upstream power feeder to a plurality of loads; a plurality of solid state power controller (SSPC) line replacement module or printed board assemblies (SSPC LRM/PBAs), wherein at least one SSPC LRM/PBA of the plurality of SSPC LRM/PBAs is coupled to the upstream power feeder and configured to receive the AC power or the DC power from the primary power source, and the at least one SSPC LRM/PBA of the plurality of SSPC LRM/PBAs includes: at least one power line communication (PLC) modem configured to communicate with an associated load; a wireless communication node configured to communicate with one or more wireless sensors; at least one analog signal interface or discrete signal interface configured to communicate data with the plurality of loads and external equipment or controllers; and a plurality of SSPC channels connected to the upstream power feeder, wherein each SSPC channel of the plurality of SSPC channels is configured to selectively connect or disconnect the upstream power feeder to or from a respective load feeder and the associated load.

Example 2 includes the secondary power distribution box of Example 1, wherein the primary power source is a primary distribution panel (PDP).

Example 3 includes the secondary power distribution box of any of Examples 1-2, wherein the primary power source is a generator.

Example 4 includes the secondary power distribution box of any of Examples 1-3, wherein the upstream power feeder is an SSPC LRM/PBA upstream power feeder.

Example 5 includes the secondary power distribution box of any of Examples 1-4, wherein the load feeder is an SSPC downstream feeder.

Example 6 includes the secondary power distribution box of any of Examples 1-5, wherein the wireless communication node is a wireless communication transceiver.

Example 7 includes the secondary power distribution box of any of Examples 1-6, wherein the at least analog signal interface or discrete signal interface comprises analog/discrete signal processing circuitry.

Example 8 includes the secondary power distribution box of any of Examples 1-7, wherein said each SSPC channel includes a solid state switch device (SSSD) configured to selectively connect or disconnect the upstream power feeder to or from the respective load feeder and the associated load in response to a control signal from an associated SSPC engine.

Example 9 includes the secondary power distribution box of any of Examples 1-8, further comprising a supervisory controller configured to communicate analog or discrete signals to or from an internal serial data bus and an external serial data bus.

Example 10 includes the secondary power distribution box of Example 9, wherein the internal serial data bus is an $I^2C$ data bus, and the external serial data bus is an ARINC 429 data bus or a CAN data bus.

Example 11 includes a method of power distribution, comprising: receiving electrical power from a power source at a power feeder network; communicating with at least one load of a plurality of loads at least in part over the power feeder network; and coupling the electrical power to the at least one load of the plurality of loads in response to the communicating with the at least one load of the plurality of loads.

Example 12 includes the method of Example 11, further comprising: communicating with one or more wireless sensors; and coupling the electrical power to the at least one load in response to the communicating with the one or more wireless sensors and the at least one load of the plurality of loads.

Example 13 includes the method of any of Examples 11-12, wherein the communicating with the at least one load of the plurality of loads comprises a power line communication (PLC) modem communicating with the at least one load of the plurality of loads.

Example 14 includes the method of any of Examples 11-13, wherein the coupling the electrical power comprises coupling the electrical power from an upstream power feeder to a downstream power feeder and a PLC modem coupled to the downstream power feeder and the at least one load.

Example 15 includes the method of any of Examples 11-14, wherein the coupling the electrical power comprises coupling the electrical power to a solid state power controller (SSPC) channel associated with the at least one load.

Example 16 includes the method of any of Examples 11-15, wherein the communicating with the at least one load of the plurality of loads comprises at least one analog or discrete signal interface communicating data with the at least one load.

Example 17 includes a system, comprising: a power source; a PDP electrically connected to the power source; a plurality of SPDBs, wherein each SPDB of the plurality of SPDBs is electrically connected to the PDP and includes an upstream power feeder configured to receive AC power or DC power from the PDP; a load feeder configured to provide the AC power or DC power from the upstream power feeder to a plurality of loads; a plurality of SSPC LRM/PBAs, wherein at least one SSPC LRM/PBA of the plurality of SSPC LRM/PBAs is coupled to the upstream power feeder and configured to receive the AC power or the DC power from the PDP, and the at least one SSPC LRM/PBA of the plurality of SSPC LRM/PBAs includes: at least one PLC modem configured to communicate with an associated load; a wireless communication node configured to communicate with one or more wireless sensors; at least one analog signal interface or discrete signal interface configured to communicate data with the plurality of loads and external equipment or controllers; and a plurality of SSPC channels connected to the upstream power feeder, wherein each SSPC channel of the plurality of SSPC channels is configured to selectively connect or disconnect the upstream power feeder to or from a respective load feeder and the associated load.

Example 18 includes the system of Example 17, wherein the upstream power feeder is an SSPC LRM/PBA upstream power feeder.

Example 19 includes the system of any of Examples 17-18, wherein the load feeder is an SSPC downstream feeder.

Example 20 includes the system of any of Examples 17-19, wherein the wireless communication node is a wireless communication transceiver.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A secondary power distribution box, comprising:
    an upstream power feeder configured to receive alternating current (AC) power or direct current (DC) power from a primary power source;
    a plurality of load feeders configured to provide the AC power or DC power from the upstream power feeder to a plurality of loads;
    a plurality of solid state power controller (SSPC) line replacement module or printed board assemblies (SSPC LRM/PBAs), wherein at least one SSPC LRM/PBA of the plurality of SSPC LRM/PBAs is coupled to the upstream power feeder and configured to receive the AC power or the DC power from the primary power source, and the at least one SSPC LRM/PBA of the plurality of SSPC LRM/PBAs includes:
        a supervisory controller configured to control power switching/distribution functions and two-way communication functions internal and external to the secondary power distribution box;
        a plurality of SSPC channels, communicatively coupled to the supervisory controller, connected to the upstream power feeder, wherein each SSPC channel of the plurality of SSPC channels is configured to selectively connect or disconnect the upstream power feeder to a respective load feeder and an associated load, wherein each of the plurality of SSPC channels includes at least one power line communication (PLC) modem, communicatively coupled to the supervisory controller, configured to communicate with the associated load for closed loop control of, and gathering health information from, the associated load;
        an internal serial communication bus coupled to the supervisory controller configured for communication with the plurality of SSPC channels;
        an external serial communication bus directly coupled to the supervisory controller and configured to communicate with external systems;
        a wireless communication node, coupled to the supervisory controller and configured to communicate with one or more wireless sensors and external communication sources including avionics systems; and
        at least one analog signal interface or discrete signal interface, separate from the external serial communication bus, communicatively coupled to the supervisory controller, configured to communicate signals with the plurality of loads and external equipment or controllers.

2. The secondary power distribution box of claim 1, wherein the primary power source is a primary distribution panel (PDP).

3. The secondary power distribution box of claim 1, wherein the primary power source is a generator.

4. The secondary power distribution box of claim 1, wherein the upstream power feeder is an SSPC LRM/PBA upstream power feeder.

5. The secondary power distribution box of claim 1, wherein the load is a heater or actuator that is controlled based on data communicated through the PLC modem.

6. The secondary power distribution box of claim 1, wherein the wireless communication node is a wireless communication transceiver that is configured to bypass the second serial communication bus to enable communication between avionics systems and the plurality of SSPC channels.

7. The secondary power distribution box of claim 1, wherein the at least analog signal interface or discrete signal interface comprises analog/discrete signal processing circuitry.

8. The secondary power distribution box of claim 1, wherein said each SSPC channel includes a solid state switch device (SSSD) configured to selectively connect or disconnect the upstream power feeder to or from the respective load feeder and the associated load in response to a control signal from an associated SSPC engine.

9. The secondary power distribution box of claim 1, wherein the supervisory controller is configured to communicate analog or discrete signals at the at least one analog signal interface or discrete signal interface to or from the first serial communication bus or the second serial communication bus.

10. The secondary power distribution box of claim 9, wherein the first serial communication bus is an $I^2C$ data bus, and the second serial communication bus is an ARINC 429 data bus or a CAN data bus.

11. A method of distributing power to, and communicating with, a plurality of loads over an integrated power distribution and communication system, the method comprising:
    receiving electrical power from a power source at a power feeder network;
    communicating power control signals with a supervisory controller of a solid state power controller (SSPC) line replacement module or printed board assembly (SSPC LRM/PBA);
    coupling the electrical power to at least one load of the plurality of loads in response to the communicating the power control signals with the supervisory controller of the SSPC LRM/PBA;
    receiving additional data from an external source through one or more of an external serial communication interface and a wireless communication interface; and
    communicating the additional data with at least one of the plurality of loads, using a power line communication (PLC) modem integrated into an SSPC of the integrated power distribution and communication system associated with the at least one of the plurality of loads, for closed loop control of, gathering health information from, and preventative protection of the at least one of the plurality of loads through an SSPC engine of the associated SSPC.

12. The method of claim 11, further comprising:
communicating with one or more wireless sensors; and
coupling the electrical power to the at least one load in response to the communicating with the supervisory controller of the SSPC LRM/PBA.

13. The method of claim 11, wherein the communicating additional data with the at least one load of the plurality of loads comprises communicating signals with a heater or actuator that is controlled based on data communicated through the PLC modem.

14. The method of claim 11, and further comprising communicating through a wireless communication transceiver associated with the SSPC that is configured to bypass a serial communication bus to enable communication between an avionics system and the SSPC LRM/PBA.

15. The method of claim 11, wherein the coupling the electrical power comprises coupling the electrical power to a solid state power controller (SSPC) channel associated with the at least one load.

16. The method of claim 11, wherein the communicating with the at least one load of the plurality of loads comprises at least one analog or discrete signal interface communicating data with the at least one load.

17. A system, comprising:
a power source;
a Primary Distribution Panel (PDP) electrically connected to the power source;
a plurality of secondary Power Distribution Boxes (SPDBs), wherein each SPDB of the plurality of SPDBs is electrically connected to the PDP and includes an upstream power feeder configured to receive alternating current (AC) power or direct current (DC) power from the PDP;
a plurality of load feeders configured to provide the AC power or DC power from the upstream power feeder to a plurality of loads;
a plurality of solid state power controller (SSPC) line replacement module or printed board assemblies (LRM/PBAs), wherein at least one SSPC LRM/PBA of the plurality of SSPC LRM/PBAs is coupled to the upstream power feeder and configured to receive the AC power or the DC power from the PDP, and the at least one SSPC LRM/PBA of the plurality of SSPC LRM/PBAs includes:

a supervisory controller configured to control power switching/distribution functions and two-way communication functions internal and external to the secondary power distribution box;
a plurality of SSPC channels, communicatively coupled to the supervisory controller, connected to the upstream power feeder, wherein each SSPC channel of the plurality of SSPC channels is configured to selectively connect or disconnect the upstream power feeder to a respective load feeder and an associated load, wherein each of the plurality of SSPC channels includes at least one power line communication (PLC) modem, communicatively coupled to the supervisory controller, configured to communicate with the associated load for closed loop control of, and gathering health information from, the associated load;
an internal serial communication bus coupled to the supervisory controller configured for communication with the plurality of SSPC channels;
an external serial communication bus coupled to the supervisory controller and configured to communicate with external systems;
a wireless communication node, coupled to the supervisory controller and configured to communicate with one or more wireless sensors and external communication sources including avionics systems;
at least one analog signal interface or discrete signal interface, separate from the external serial communication bus, communicatively coupled to the supervisory controller, configured to communicate signals with the plurality of loads and external equipment or controllers.

18. The system of claim 17, wherein the upstream power feeder is an SSPC LRM/PBA upstream power feeder.

19. The system of claim 17, wherein the load is a heater or actuator that is controlled based on data communicated through the PLC modem.

20. The system of claim 17, wherein the wireless communication node is a wireless communication transceiver that is configured to bypass the second serial communication bus to enable communication between avionics systems and the plurality of SSPC channels.

\* \* \* \* \*